United States Patent
Vasavada et al.

(10) Patent No.: US 7,370,014 B1
(45) Date of Patent: May 6, 2008

(54) ELECTRONIC BILL PRESENTMENT AND PAYMENT SYSTEM THAT OBTAINS USER BILL INFORMATION FROM BILLER WEB SITES

(75) Inventors: Dhaval Vasavada, Belle Mead, NJ (US); Alex Kosowski, Hamilton Square, NJ (US); Eric Jamison, Edison, NJ (US)

(73) Assignee: Metavante Corporation, Brown Deer, WI (US)

( * ) Notice: Subject to any disclaimer, the term of this patent is extended or adjusted under 35 U.S.C. 154(b) by 1313 days.

(21) Appl. No.: 09/999,311

(22) Filed: Nov. 1, 2001

(51) Int. Cl.
 *G06Q 40/00* (2006.01)
(52) U.S. Cl. .............................. 705/40; 705/1; 705/35; 705/39
(58) Field of Classification Search .................... 705/1, 705/35, 39, 40; 235/275
 See application file for complete search history.

(56) References Cited

U.S. PATENT DOCUMENTS

| | | | |
|---|---|---|---|
| 3,833,885 | A | 5/1973 | Gentile et al. |
| 4,277,837 | A | 7/1981 | Stuckert |
| 4,315,101 | A | 2/1982 | Atalla |
| 4,317,957 | A | 3/1982 | Sendrow |
| 4,319,336 | A | 3/1982 | Anderson et al. |
| 4,420,751 | A | 12/1983 | Paganini et al. |
| 4,454,414 | A | 6/1984 | Benton |
| 4,460,960 | A | 7/1984 | Anderson et al. |
| 4,634,845 | A | 1/1987 | Hale et al. |
| 4,678,895 | A | 7/1987 | Tateisi et al. |

(Continued)

FOREIGN PATENT DOCUMENTS

EP 1020824 A2 7/2000

(Continued)

OTHER PUBLICATIONS

Trisense Software; "Paysense:The Way Payments will be".*

(Continued)

*Primary Examiner*—Alain L. Bashore
(74) *Attorney, Agent, or Firm*—Reinhart Boerner Van Deuren s.c.

(57) ABSTRACT

An electronic bill presentation and payment (EBPP) system that is able to obtain bills for its customers from scrape-enabled biller Web sites. The EBPP system has an interface which permits a customer to specify that the customer wishes the EBPP system to retrieve a customer's bills from a biller Web site at which the customer may access them. The customer provides his or her access information for the biller Web site to the EBPP system, which then uses a software agent to make scheduled scrapes of the biller Web site to obtain the customer's bill. The software agent scrapes not only bill summary information such as the account number, the statement date, the bill amount, the payment due date, the minimum amount and/or total amount due from the biller Web site, but also scrapes display information for the bill. The display information is the HTML that the biller Web site itself uses to display the bill. The agent cleans the HTML so that it can be displayed in the environment provided by the EBPP system. Both the bill summary information and the display information are incorporated into databases maintained by the EBPP system, which treats bills obtained from scrape-enabled Web sites in the same fashion as bills obtained from other sources.

21 Claims, 14 Drawing Sheets

U.S. PATENT DOCUMENTS

| | | |
|---|---|---|
| 4,689,478 A | 8/1987 | Hale et al. |
| 4,695,880 A | 9/1987 | Johnson et al. |
| 4,727,243 A | 2/1988 | Savar |
| 4,734,858 A | 3/1988 | Schlafly |
| 4,799,156 A | 1/1989 | Shavit et al. |
| 4,823,264 A | 4/1989 | Deming |
| 4,947,028 A | 8/1990 | Gorog |
| 5,007,084 A | 4/1991 | Materna et al. |
| 5,025,373 A | 6/1991 | Keyser, Jr. et al. |
| 5,220,501 A | 6/1993 | Lawlor et al. |
| 5,231,571 A | 7/1993 | D'Agostino |
| 5,265,033 A | 11/1993 | Vajk et al. |
| 5,283,829 A | 2/1994 | Anderson |
| 5,287,270 A | 2/1994 | Hardy et al. |
| 5,325,290 A | 6/1994 | Cauffman et al. |
| 5,326,959 A | 7/1994 | Perazza |
| 5,336,870 A | 8/1994 | Hughes et al. |
| 5,341,429 A | 8/1994 | Stringer et al. |
| 5,347,632 A | 9/1994 | Filepp et al. |
| 5,383,113 A | 1/1995 | Kight et al. |
| 5,420,405 A | 5/1995 | Chasek |
| 5,424,938 A | 6/1995 | Wagner et al. |
| 5,465,206 A | 11/1995 | Hilt et al. |
| 5,473,143 A | 12/1995 | Vak et al. |
| 5,483,445 A | 1/1996 | Pickering |
| 5,594,910 A | 1/1997 | Filepp et al. |
| 5,649,117 A | 7/1997 | Landry |
| 5,655,089 A | 8/1997 | Bucci |
| 5,699,528 A | 12/1997 | Hogan |
| 5,710,887 A | 1/1998 | Chelliah et al. |
| 5,710,889 A | 1/1998 | Clark et al. |
| 5,717,868 A | 2/1998 | James |
| 5,727,129 A | 3/1998 | Barrett et al. |
| 5,727,249 A | 3/1998 | Pollin |
| 5,729,693 A | 3/1998 | Holda-Fleck |
| 5,745,886 A | 4/1998 | Rosen |
| 5,754,939 A | 5/1998 | Herz et al. |
| 5,787,403 A | 7/1998 | Randle |
| 5,815,665 A | 9/1998 | Teper et al. |
| 5,826,242 A | 10/1998 | Montulli |
| 5,832,460 A | 11/1998 | Bednar et al. |
| 5,845,267 A | 12/1998 | Ronen |
| 5,848,396 A | 12/1998 | Gerace |
| 5,848,400 A | 12/1998 | Chang |
| 5,857,190 A | 1/1999 | Brown |
| 5,870,559 A | 2/1999 | Leshem et al. |
| 5,870,724 A | 2/1999 | Lawlor et al. |
| 5,873,072 A | 2/1999 | Kight et al. |
| 5,884,288 A | 3/1999 | Chang et al. |
| 5,884,290 A | 3/1999 | Smorodinsky et al. |
| 5,884,312 A * | 3/1999 | Dustan et al. ............. 707/10 |
| 5,890,140 A | 3/1999 | Clark et al. |
| 5,903,721 A | 5/1999 | Sixtus |
| 5,903,732 A | 5/1999 | Reed et al. |
| 5,905,976 A | 5/1999 | Mjolsnes et al. |
| 5,920,847 A | 7/1999 | Kolling et al. |
| 5,930,759 A | 7/1999 | Moore et al. |
| 5,943,656 A | 8/1999 | Crooks et al. |
| 5,956,693 A | 9/1999 | Geerlings |
| 5,956,695 A | 9/1999 | Carrithers et al. |
| 5,956,700 A | 9/1999 | Landry |
| 5,963,925 A | 10/1999 | Kolling et al. |
| 5,974,146 A | 10/1999 | Randle et al. |
| 5,978,780 A | 11/1999 | Watson |
| 5,987,440 A | 11/1999 | O'Neil et al. |
| 6,000,033 A | 12/1999 | Kelley et al. |
| 6,006,333 A | 12/1999 | Nielsen |
| 6,029,151 A | 2/2000 | Nikander |
| 6,032,133 A | 2/2000 | Hilt et al. |
| 6,038,597 A | 3/2000 | Van Wyngarden |
| 6,044,362 A | 3/2000 | Neely |
| 6,049,786 A | 4/2000 | Smorodinsky |
| 6,052,457 A | 4/2000 | Abdelaal et al. |
| 6,052,671 A * | 4/2000 | Crooks et al. ............. 705/34 |
| 6,052,730 A | 4/2000 | Felciano et al. |
| 6,055,567 A | 4/2000 | Ganesan et al. |
| 6,058,380 A | 5/2000 | Anderson et al. |
| 6,065,012 A | 5/2000 | Balsara et al. |
| 6,070,150 A | 5/2000 | Remington et al. |
| 6,072,870 A | 6/2000 | Nguyen et al. |
| 6,078,907 A | 6/2000 | Lamm |
| 6,085,177 A | 7/2000 | Semple et al. |
| 6,085,191 A | 7/2000 | Fisher et al. |
| 6,097,834 A | 8/2000 | Krouse et al. |
| 6,098,053 A | 8/2000 | Slater |
| 6,119,106 A | 9/2000 | Mersky et al. |
| 6,119,107 A | 9/2000 | Polk |
| 6,119,109 A | 9/2000 | Muratani et al. |
| 6,122,625 A | 9/2000 | Rosen |
| 6,128,603 A | 10/2000 | Dent et al. |
| 6,173,272 B1 | 1/2001 | Thomas et al. |
| 6,178,511 B1 | 1/2001 | Cohen et al. |
| 6,182,052 B1 | 1/2001 | Fulton et al. |
| 6,199,077 B1 | 3/2001 | Inala et al. |
| 6,253,203 B1 | 6/2001 | O'Flaherty et al. |
| 6,275,824 B1 | 8/2001 | O'Flaherty et al. |
| 6,289,322 B1 | 9/2001 | Kitchen et al. |
| 6,292,789 B1 | 9/2001 | Schutzer |
| 6,327,577 B1 | 12/2001 | Garrison et al. |
| 6,334,116 B1 | 12/2001 | Ganesan et al. |
| 6,363,362 B1 | 3/2002 | Burfield et al. |
| 6,381,584 B1 | 4/2002 | Ogram |
| 6,393,407 B1 | 5/2002 | Middleton, III et al. |
| 6,412,073 B1 | 6/2002 | Rangan |
| 6,446,119 B1 | 9/2002 | Olah et al. |
| 6,578,015 B1 * | 6/2003 | Haseltine et al. ............. 705/34 |
| 2001/0002535 A1 | 6/2001 | Liebig et al. |
| 2001/0037296 A1 | 11/2001 | Ganesan et al. |
| 2001/0044776 A1 | 11/2001 | Kight et al. |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0062282 A1 | 5/2002 | Kight et al. |
| 2002/0065773 A1 | 5/2002 | Kight et al. |
| 2002/0087427 A1 | 7/2002 | Ganesan et al. |
| 2002/0087461 A1 | 7/2002 | Ganesan et al. |
| 2002/0087465 A1 | 7/2002 | Ganesan et al. |
| 2002/0087468 A1 | 7/2002 | Ganesan et al. |
| 2002/0087469 A1 | 7/2002 | Ganesan et al. |
| 2002/0087471 A1 | 7/2002 | Ganesan et al. |
| 2002/0184144 A1 * | 12/2002 | Byrd et al. ............. 705/40 |
| 2002/0194125 A1 | 12/2002 | Shimada |

FOREIGN PATENT DOCUMENTS

| | | |
|---|---|---|
| EP | 1043668 A2 | 11/2000 |
| EP | 1049056 A2 | 11/2000 |
| EP | 1052603 A2 | 11/2000 |
| EP | 1083532 A2 | 3/2001 |
| EP | 1091330 A2 | 4/2001 |
| EP | 1111559 A2 | 6/2001 |
| EP | 1136922 A1 | 9/2001 |
| EP | 1136923 A1 | 9/2001 |
| EP | 1136924 A1 | 9/2001 |
| GB | 2294566 A | 5/1996 |
| WO | WO 99/18529 | 4/1999 |
| WO | WO99/42944 | 8/1999 |
| WO | WO00/48085 | 8/2000 |

| | | |
|---|---|---|
| WO | WO 01/77938 | 10/2001 |
| WO | WO 02/14985 | 2/2002 |

OTHER PUBLICATIONS

Killen and Associates;Electronic Bill Presentation and Payments: Markets, Framework and Suppliers; vol. 1; Palo Alto, CA.*
Visa; Visa Home Banking and Bill Payment Solution.*
Richard K. Crone; Screen Scraping: The monster IBPP wave you absolutely must catch, IBPP Strategies and Trends; Dove Consulting.*
Richard Crone; Unlocking Treasures Untold; The Revenue Genewrating Power of IBPP and Anonymous Profile Marketing; Dove Consulting.*
Chip Wickenden, CCM, "The next wave"; Consumer EDI.*
Visa; "Consumer Electronic InvoicePresentment: Not Your Everyday EDI"; StertConf.*
Billserv; "EBPP White Paper".*
Avolent, "The return on Investment of EIPP"; Avalent B2B White Paper; pp. 14-19.*
Avolent, Market Evolution for EIPP; Avolent B2B White Paper; pp. 10-13.*
Council for Electronic Billing and Payment, Business-to-Business EIPP: Presentment Models and Payment Options, Part One: Presentment Models, Jan. 2001, National Automated Cleaning House Association, Herndon, VA.
Council for Electronic Billing and Payment, Business-to-Business EIPP: Presentment Models and Payment Options, Part Two: Payment Options, Jan 2001, National Automated Clearing House Association, Herndon, VA.
Arald Jean-Charles and Suhas D. Joshi, Architectural Choices for OSS Integration, eAI Journal, Sep. 2001, pp. 59-63.
Interoperabill Initiative of the Banking Industry Technology Secretariat (BITS), Electronic Bill Presentment and Payment (EBPP) Business Practices, May 9, 2000, Edition 2.1, Draft for Comment, Council for Electronic Billing and Payment of the National Automated Clearing House Association (NACHA).
Business Practices Task Force of NACHA's Council for Electronic Billing and Payment, An Overview of Electronic Bill Presentment and Payment Operating Models: Process, Roles, Communications, and Transaction Flows, Apr. 9, 1999.
PRICEWATERHOUSECOOPERS, Electronic Bill Presentment and Payment: A Primer, Zurich-Oerlikon.
James S. Diggs, Electronic Commerce and the Document: An Old Lexicon Re-Energized, Xploration Spring, 1997, pp. 26-29.
Robert Landry, Ian Rubin, Richard Bell, Retail Banking Delivery Technology: Channels in Transition, Financial Services Technology Conference, Apr. 27-28, 1998, The Tower Group, Newton, MA.
Robert Landry, Forecasting How U.S. Delivery Channels Will Play Out, FutureBanker, Aug. 1997, pp. 46-49.
Thomas P. Vartanian, Future Banking: Reinventing the Bank As an Idea Factory, American Banker, Aug. 19, 1996.
Thomas P. Vartanian, Future Banking: Key Question for Emerging Systems: Where is the Money? American Banker, Jun. 17, 1996.
Charles G. Moody, III, From the Publisher: Outsourcing, American Waste Digest, Jul 1998, p. 9.
No Author Name Given, Everyone's Knocking on Home Banking's Door, Business Week, Sep. 24, 2001.
No Author Name Given, Bill Gates is Rattling the Teller's Window, Business Week, Sep. 24, 2001.
No Author Name Given, Call it E-Money Management, Business Week, Sep. 24, 2001.
The Advisory Board Company, A Proposition Beyond Rescue: The Pure Play Advantage, 1996, pp. 41-72.
The Advisory Board Company, Chapter III: Creating New Payments Businesses, 1996, pp. 283-298.
The Advisory Board Company, VI: Creating New Payments Businesses, 1996, pp. 113-146.
ASC X12 Finance Subcommittee, Models for Consumer Billing and Payment Systems, Jun. 1995, Technical Report Type 2.
ASC X12 Finance Subcommittee, Models for Consumer Billing and Payment Systems, Oct. 1995, Technical Report Type II.
Michael C. McChesney, Banking in Cyberspace: an investment in itself, Banking/Investing, IEEE Spectrum Feb. 1997, pp. 54-63.
No Author Name Given, Online Banking Report, Home Banking Partners, Issue 32, Dec. 1997.
Just in Time Solutions, AT&T and Intuit. Open Internet Billing: White Paper, Jun. 1998.
David Lamm, The Effect of the Internet on Payment Processing, The Association for Work Process Improvement, Apr. 27, 1999, Boston, MA.
Leslie Thwaits, The Check's on the Net: CheckFree is Making Electronic Commerce Hassle Free, SourceBook, Apr. 1999, pp. 17-20, The Reddy Corporation International.
ASC X12 Finance Subcommittee, Reference Model for Addressing Financial Transactions, Technical Report Type 2, Jun. 1996.
ASC X12 Finance Subcommittee, Consumer Service Provider Billing & Payment System Work Group, Meeting Notes from Jun. 1995 X12F Trimester Meeting, Sep. 1995.
Visa, Bill Interest in Electronic Remittance, Bill Payment Council Meeting, Oct. 17, 1994, Methesda, MD.
ASC X12 Finance Subcommittee, Models for Payment Systems, Technical Report Type 2, ASC X12 Procedures Review Board, Feb. 1995.
A. Litan, The Consumer E-Billing Hype Cycle, Research Note, Dec. 19, 2000, GartnerGroup.
A. Litan, Consumer E-Billing Shakout: The Dust Starts to Settle, Research Note Oct. 3, 2000, GartnerGroup.
A. Kerr and A. Litan, Trends in Bsuiness-to-Consumer Electronic Bill Presentment and Payment, Context Overview Report, Aug. 25, 2000, GartnerGroup.
A. Litan, Consumer E-Bill Payment: Built, but When Will They Come? Research Note, Feb. 18, 2000, GartnerGroup.
A. Litan, Three Banks Enter E-Billing Race with Post Office Model, Research Note, Jul. 15, 1999, GartnerGroup.
A. Litan, Future Bill Distribution: Internet Post Office Model, Research Note, Apr. 9, 1999, GartnerGroup.
Gaston Hummel, EBPP, Group 1 Software Europe, Ltd., Sep. 11, 2001.
Nicolette Lemmon, David Gourley and James Ward, Member Acceptance of Electronic Access Systems: Innovators versus Laggards, Center for Credit Union Research, University of Wisconsin-Madison School of Business and the Filene Research Institute, 1999.
David B. Humphrey, Ph.D., Prospective Changes in Payment Systems: Implications for Credit Unions, Florida State University, Center for Credit Union Research, University of Wisconsin-Madison School of Business and the Filene Research Institute, 1997.
Jody Cornish and Octavio Marenzi, Scan and Pay Services: The Future of Electronic Bill Presentment, Celent Communications, May 2000, Cambridge, MA.
Jody Cornish, Octavio Marenzi and Sang Lee, Banks and Electronic Bill Presentment: A Survey, Celent Communications, Apr. 2000, Cambridge, MA.
Avolent, Using BizCast to Capture ROI and Automate the Invoice-to-Pay Process, Avolent B2B White Paper, 2001, pp. 20-28.
Greg Sward and Brian Valente, Successfully Automating the Invoice-to-Pay Process, Avolent B2B White Paper, Feb. 2001, pp. 1-9.
Paytrust brochure from the paytrust.com Web site, Oct. 2001.
The Advisory Board Company, A Propostition Beyond Rescue: The Pure Play Advantage, 1996, pp. 41-72.
Stoneman, B., Fitting It All Together, Banking Strategies, Mar./Apr. 2000, vol. 76, No. 2, pp. 50-58.
Hallerman, D., Banks Strike Back With An E-Bill Challenge, Bank Technology News, Aug. 1999.
No Author Name Given, Non-Bank Puts E-Payments At ATMs To The Test, Bank Network News. May 1999.
Netdelivery Corporation, EDM: Electronic Delivery Management: The Delivery Service for Electronic Commerce, Boulder, CO. Apr. 1999.
Gary B., Meshell, A Perspective on Electronic Commerce and Payments, Price Waterhouse. 1999.
Sharon Osberg, "Wells Fargo: Standards-Based Electronic Bill Presentment and Payment (EBPP)", Nov. 1999, XP-002192923.

* cited by examiner

FIG. 4

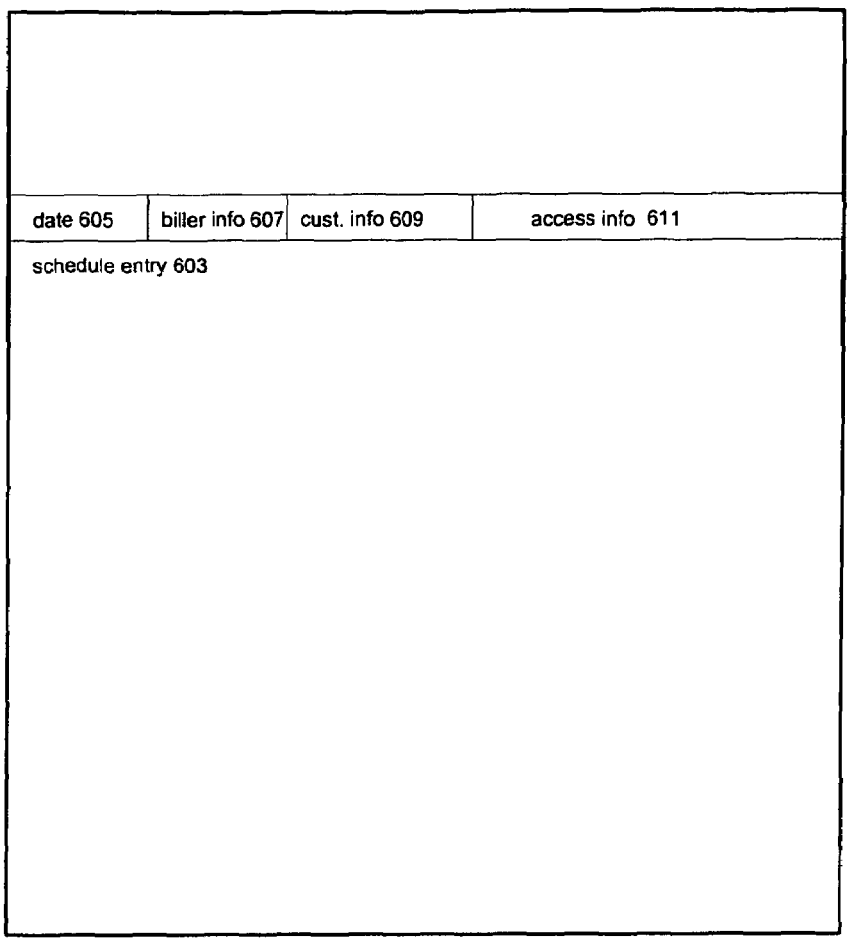
Schedule 601
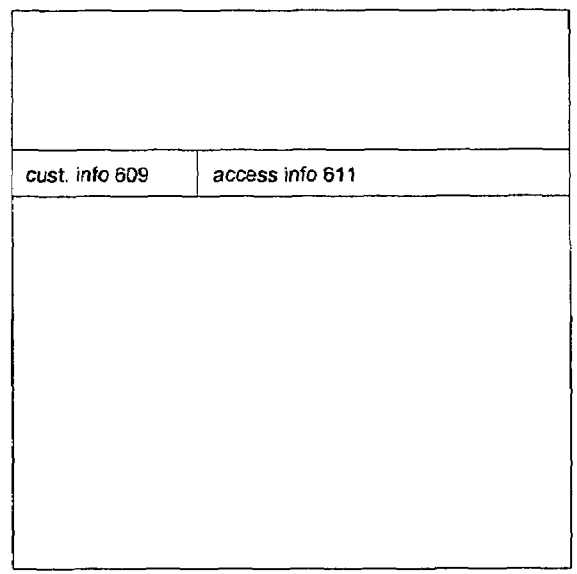
Per-date and biller schedule for bot execution 613
FIG. 6

Statement

| | | | |
|---|---|---|---|
| Name: | 705 JOHN R DOE | Minimum Amount Due: | 707 $20.00 |
| Account Number: | 709 XXXX- XXXX- XXXX- XXXX | Payment Due Date*: | 711 10/10/2001 |
| Statement/Closing Date: | 713 09/20/2001 | | |

*Payment must be received by 1:00pm local time on 10/10/2001 header 703

| | | | |
|---|---|---|---|
| $10,500 | $9,886 | $5,300 | $613.57 |
| $0.00 | $0.00 | $20.00 | $20.00 |

Credit line info 715

| | | | | |
|---|---|---|---|---|
| 09/11 | 09/11 | R4394726 | ELECTRONIC PAYMENT-THANK YOU | -324.03 |
| 08/30 | 08/30 | LJRZM4XQ | EDDIE BAUER 0433 NEW YORK NY | -29.39 |
| 09/07 | 09/07 | 79ZSXP30 | LORD&TAYLOR BANDOLINO LAURENCEVILLE NJ | -59.00 |
| 08/22 | 08/22 | BMB*YZT6 | WILLIAMS-SONOMA M/O 800-5411262 CA | 98.06 |
| 08/24 | 08/24 | J9KSY6KJ | VICTORIAS SECR00011007 NEW YORK NY | 142.00 |
| 08/29 | 08/29 | L19MMWD3 | MERCURY BAR NEW YORK NY | 39.00 |
| 08/30 | 08/30 | J58SY6KJ | VICTORIAS SECR00011007 NEW YORK NY | 90.50 |
| 09/04 | 09/04 | BFCL1F00 | T#:104 NY PENN STATION NEW YORK NY | 171.00 |
| 09/09 | 09/09 | KTTZ266S | TOTO DRY CLEANERS EDISON NJ | 46.80 |
| 09/10 | 09/10 | DK03L144 | PHILLIPS CLUB NEW YORK NY | 94.60 |
| 09/12 | 09/12 | CL01ST30 | MTA VENDING MACHINE SA 212-METROCARD NY | 20.00 |

721  723  725                           727                                   729

*Transaction details are available by clicking on the dollar amount for the transaction.

Account detail 717 entry 719

FIG 7A   701

Sign up for All₁Electronic today.
 732  You'll get your statement online and pay your bill
     electronically, too. No more paper statements...or checks.
     We'll notify you by email when your statement is ready
     each month.

| | | | | | |
|---|---|---|---|---|---|
| PURCHASES | $324.03 | $701.96 | $412.42 | $0.00 | $613.57 735 |
| ADVANCES | $0.00 | $0.00 | $0.00 | $0.00 | $0.00 737 |
| TOTAL | $324.03 | $701.96 | $412.42 | $0.00 | $613.57 739 |
| | 741 | 743 | 745 | 747 | 749 |

701 message 731 summary 733

FIG. 7B

Your Citibank Card Services Statement

Name: John R Doe  
Account Number: XXXX-XXXX-XXXX-XXXX  
Statement/Closing Date: 09/20/2001  
Minimum Amount Due: $20.00  
Payment Due Date*: 10/10/2001

*Payment must be received by 1:00pm local time on 10/10/2001

| | | | | | |
|---|---|---|---|---|---|
| $10,500 | $9,886 | $0.00 | $0.00 | $5,300 | $613.57 |

| | | | | | |
|---|---|---|---|---|---|
| | | | | $5,300 | $20.00 |

| | | | | 805 |
|---|---|---|---|---|
| 09/11 | 09/11 | R4394726 | ELECTRONIC PAYMENT-THANK YOU | -324.03 |
| 08/30 | 08/30 | LJRZM4XQ | EDDIE BAUER 0433 NEW YORK NY | -29.39 |
| 09/07 | 09/07 | 79ZSXP30 | LORD&TAYLOR BANDOLINO LAURENCEVILLE NJ | -59.00 |
| 08/22 | 08/22 | BMB*YZT6 | WILLIAMS-SONOMA M/O 800-5411262 CA | 98.06 |
| 08/24 | 08/24 | J9KSY6KJ | VICTORIAS SECR00011007 NEW YORK NY | 142.00 |
| 08/29 | 08/29 | L19MMWD3 | MERCURY BAR NEW YORK NY | 39.00 |
| 08/30 | 08/30 | J58SY6KJ | VICTORIAS SECR00011007 NEW YORK NY | 90.50 |
| 09/04 | 09/04 | BFCL1F00 | T#104 NY PENN STATION NEW YORK NY | 171.00 |
| 09/09 | 09/09 | KTTZ266S | TOTO DRY CLEANERS EDISON NJ | 46.80 |
| 09/10 | 09/10 | DK03L144 | PHILLIPS CLUB NEW YORK NY | 94.60 |
| 09/12 | 09/12 | CL01ST30 | MTA VENDING MACHINE SA 212-METROCARD NY | 20.00 |

Sign up for All-Electronic today.

FIG. 8

```
        <html>
        <head>
           <title>Cardmember Central Account Online - Statement Transactions
        </title>
             <link rel='stylesheet' href='/CB/styles/citi_iestyle.css' type='text/css'>
903

<SCRIPT Language=Javascript>
              function popUp(pPage,winOpts)
              {
                  if (popUpWin!=null)   { popUpWin.close(); }
                  var options =
        'resizable=no,scrollbars=yes,menubar=no,toolbar=no' + winOpts;
                  var popUpWin = window.open(pPage,'popWin',options);
                  popUpWin.focus();
901           }
           </SCRIPT>
        </head>
        <body bgcolor=#ffffff marginheight=0 marginwidth=0 topmargin=0 leftmargin=0>

<div id="maincontents">
          <table width=770 cellspacing=0 cellpadding=0 border=0>
905         <tr>
              <td valign=top align=left width=23><img
        src="/scrapedu/20010921/32/Shared_files/-1288661497arr_sec.gif" width=23
        height=19 border=0></td>
              <td valign=top align=left>
                 <!---------- main contents ----------->
                    <span class=pageheading>Statement</span><br><br>
```

```
        <html>
        <head>
           <title>Cardmember Central Account Online - Statement Transactions</title>
             <link rel='stylesheet' href='citi_iestyle.css' type='text/css'>
        909

<SCRIPT Language=Javascript>
              function popUp(pPage,winOpts)
              {
                  if (popUpWin!=null)   { popUpWin.close(); }
                  var options = 'resizable=no,scrollbars=yes,menubar=no,toolbar=no' +
        winOpts;
                  var popUpWin = window.open(pPage,'popWin',options);
                  popUpWin.focus();
907           }
           </SCRIPT>
        </head>
        <BODY><div align=center>
        <b><FONT FACE="Arial" COLOR="DarkBlue" SIZE="4">Your Citibank Card Services
        Statement<br></FONT></b><br>
                                                                       911

<div id="maincontents">
          <table width=770 cellspacing=0 cellpadding=0 border=0>
        913   <tr>
                <td valign=top align=left width=23></td>
                <td valign=top align=left>
                   <!---------- main contents ----------->
                      <br><br>
```

FIG. 9

```
                <TR>
            ┌─  <TD VALIGN=TOP ALIGN=LEFT>
     1003  ┤      09/12
            └─  </TD>
                <TD VALIGN=TOP ALIGN=LEFT>
                  09/12
                </TD>
                <TD VALIGN=TOP ALIGN=LEFT>
                  CL01ST30
                </TD>
                <TD VALIGN=TOP ALIGN=LEFT>
                  MTA VENDING MACHINE SA 212-METROCARD NY
                </TD>
                <TD VALIGN=TOP ALIGN=RIGHT>  ── 1007
                  <A HREF="/CB/amount.jsp?
                POSTING_DATE=
                09%2F12%2F2001
                &SALE_DATE=
                09%2F12%2F2001
                &TRANSACTION_TYPE_TEXT=
                PURCHASE++
1001           &REFERENCE_NUMBER=
                CL01ST30
                &PERSON_NAME=
                DONNA+JAMISON
                &TRANSACTION_AMOUNT=
                20.00
     1005      &FOREIGN_CURRENCY=                                                    1009

&MERCHANT_DESCRIPTION=
                MTA+VENDING+MACHINE+SA+212-METROCARD+NY+
                &SIC_DESCRIPTION=
                LOCAL%2FSUBURBAN+COMMUTER+PASSENGER+TRANS+
                &STATEMENT_DATE=
                09%2F20%2F2001"
                              ONMOUSEOVER="window.status='See about this transaction';
                                 return true"
                              ONMOUSEOUT="window.status='';
                                 return true"
                              TARGET="DETAIL">
                              20.00
                          </A>
                        </TD>
                      </TR>

<TR>
                  <TD VALIGN=TOP ALIGN=LEFT>
                    09/12
                  </TD>
                  <TD VALIGN=TOP ALIGN=LEFT>
                    09/12
                  </TD>
                  <TD VALIGN=TOP ALIGN=LEFT>
                    CL01ST30
     1011          </TD>
                  <TD VALIGN=TOP ALIGN=LEFT>
                    MTA VENDING MACHINE SA 212-METROCARD NY
                  </TD>
                  <TD VALIGN=TOP ALIGN=RIGHT>

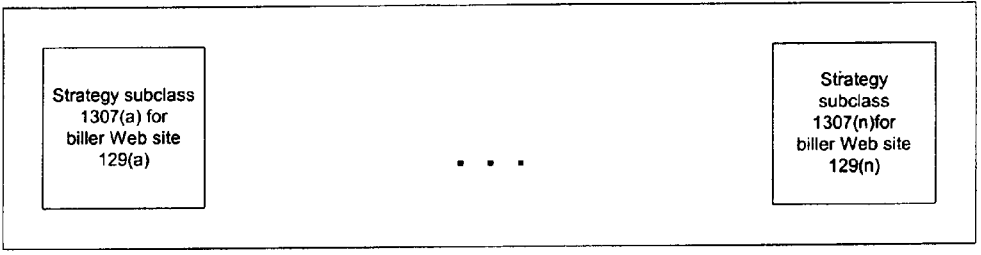
BillBot main program 1303
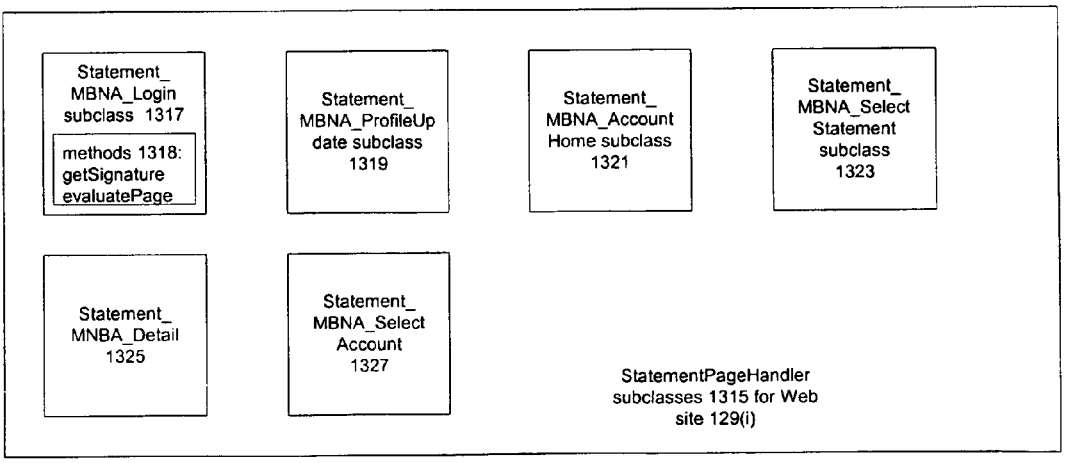
FIG. 13

ELECTRONIC BILL PRESENTMENT AND PAYMENT SYSTEM THAT OBTAINS USER BILL INFORMATION FROM BILLER WEB SITES

BACKGROUND OF THE INVENTION

1. Field of the Invention

The invention relates to electronic bill presentation and payment (EBPP) systems and more particularly to EBPP systems that aggregate items of bill data for a user from a number of different kinds of sources. The invention further relates to techniques for obtaining data from Web pages.

2. Description of Related Art

Electronic Bill Presentation and Payment Systems

Electronic bill presentation and payment systems are systems that automate bill paying for users of networked computers. An example of such a system is the Paytrust EBPP system, operated under the trademark Paytrust.com™ by Paytru$t, Inc., 101 Grover's Mill Rd., Lawrenceville, N.J. 08648.

In the Paytrust EBPP system as it existed before the invention described in the present patent application was incorporated into it, a Paytrust customer directed his or her billers to send the customer's bills to Paytrust instead of to the customer. For most billers, this simply means mailing the bill to Paytrust instead of to the customer. When Paytrust receives a customer's bill in the mail, Paytrust scans the bill to obtain an image of the bill and applies optical character recognition (OCR) technology to the scanned bill to read an item of bill data from the image. An item of bill data will typically include the account number, the statement date, the bill amount, the payment due date, minimum amount due, and/or total amount due. The image and the item of bill data are then input to the Paytrust EBPP system, which adds the image and the item of bill data to a database of bills that is maintained by the Paytrust EBPP system. The bills in the database are locatable by the name of the customer who received the bill and the name of the biller who sent the bill. The database also includes information about the billers including the address to which payment is to be sent and information about the customers including the bank or other accounts from which the customer's bills are to be paid. Some billers are able to provide their bills to Paytrust electronically, either directly or via a biller service provider. The electronic bill includes an image of the bill and the item of bill data. With these bills, the steps of scanning the bill and using OCR to obtain the bill information are not necessary; instead the electronic bills are added directly to the database.

Paytrust customers interact with the Paytrust EBPP system by means of the World Wide Web. The system maintains a Web site to which the customer has secure access. Using the secure access, the customer can request that Paytrust display a Web page that contains a list of the bills presently owed by the customer. The customer can use a pointing device to see the image of a bill on the list and to select a bill from the list for payment. When a bill has been selected, Paytrust pays the biller from the bank account specified by the customer. Other features of the Paytrust EBPP system include notification of the customer by email of the arrival of a bill, notification by email that an unpaid bill has come due, tracking of bill payment history, customer-specified reports based on the bill history, and the SmartBalance™ bank account balance feature, which will be explained in detail below.

An assumption made in the original design of the Paytrust EBPP system was that many billers would change their billing procedures so that they could provide either electronic bills or paper bills. That has not happened as quickly as originally anticipated. On the other hand, many billers are now maintaining Web sites at which their customers can access their current statements. These Web sites provide the customer with "electronic bills", albeit in the form of information contained in HTML pages rather than in the form used in the standard electronic bills for which the Paytrust system was originally designed. What was needed was a way of obtaining the HTML forms of the electronic bills from the billers' Web sites, extracting an image of the bill and the item of bill datafrom the HTML forms, and adding this information to the Paytrust system's bill databases.

"Scraping" Data from HTML Pages

The information which a user receives from a Web site is in the form of an HTML page. The user's Web browser interprets the HTML page to produce the display that appears on the user's display device. The HTML page is made up of a sequence of elements which may be nested. Each element has the form:

<html_tag> element content </html_tag>

The tags determine how the browser displays the content of the element. The tags' meanings are defined in the HTML standard. As is apparent from the foregoing description of an HTML page, if one knows the location of an element in the HTML page, one can go to that location in the page and read the content of the element. What's more, a program can be written that will do the same thing. The technique of using a program to locate an element on an HTML page and read that element's content is termed screen scraping. Of course, the program that does the screen scraping is specific to the HTML page or pages from which the content is being read.

One example of the use of screen scraping is Paytrust's SmartBalance feature. The feature provides Paytrust customers with bank balances that take into account the bills that the customer has selected for payment. SmartBalance takes advantage of the fact that many financial institutions now have Web sites where their customers can securely access their account balances. The Paytrust interactive display that displays the lists of bills and payments includes a button that takes the customer to a page of banks. The page includes a list of banks for which Paytrust has developed scraping programs to read the banks' account balance Web pages. The SmartBalance feature only works with these banks. When the Paytrust customer enters his or her user identification and clicks on a login button, the Paytrust system acts as a proxy for the Paytrust customer: it employs the customer's user identification to access the customer's account balance information at the financial institution's Web site, scrapes the HTML page on which the balance information occurs, and returns the scraped data to the Paytrust System. The scraped data includes the time and date at which the account balance on the Web site was last updated and the balance. Using this information, the Paytrust system then computes a current balance (the SmartBalance) by subtracting from the account balance the amounts of bills paid using Paytrust since the last time the account balance was updated. Finally, the Paytrust system displays the SmartBalance to the customer.

Another use of screen scraping is aggregation of account balances for all of a user's accounts at a single site. Yodlee.com, Inc., of Sunnyvale, Calif. is a provider of one such services, called My Yodlee. Techniques used in the My Yodlee service are further the subject of U.S. Pat. No. 6,199,077B12, Inala, et al., Server-side Web summary generation and presentation, issued Mar. 6, 2001. My Yodlee aggregates account information from a large number of financial institutions. When a user wishes to use the My Yodlee service, he or she provides the service with account identification and user identification information for each of the accounts whose balances the user wants to appear on the Web page that My Yodlee provides to the user. The My Yodlee services includes a software agent, familiarly terms a bot, for each of the financial institutions from which My Yodlee aggregates account information. The bot does the scraping on the HTML provided by the financial institution's Web site.

A bot for a given financial institution is run periodically. On each run, the bot has the user identification information for all of the users for which My Yodlee is aggregating account information from that financial institution. The bot uses the user identification information to access the Web page for each user on the list, scrapes the account balance information from the Web page, and returns it to My Yodlee's Web site, which stores it in a database under the user's name. When the user wishes to see his or her account balances, My Yodlee creates a Web page for the user upon which the balances currently listed in the database for the user are displayed.

The techniques of screen scraping may be employed generally to make an HTML page a source of "electronic data", Paytrust's SmartBalance technique shows how a system may use account and user identification information provided by a user to gain access to a Web page for purposes of screen scraping, and My Yodlee's software agents show how screen scraping may be done without direct user intervention. However, none of these techniques are applicable as they stand to the problem of integrating statement information that is available to a customer of an EBPP system at the biller's Web site with the statement information that is available to the EBPP system from sources such as mailed paper bills or bills provided directly to the EBPP system in electronic form. It is an object of the present invention to provide methods and apparatus for integrating statement information from biller Web sites with statement information available to the EBPP from other sources. It is a further object of the invention to provide a technique for obtaining information from a biller Web site that permits display of a bill by the EBPP system.

SUMMARY OF THE INVENTION

The object of the invention is achieved by providing an EBPP system in which a customer of the EBPP system inputs access information to the EBPP system which the customer uses to access the biller's Web site. The EBPP system then uses the access information to make scheduled accesses to the biller's Web site via the network and thereby provide a bill displayed on the Web site for the customer to the EBPP system, which incorporates information from the bill into the items of bill data that it maintains for the customer. The EBPP system treats item of bill data that is obtained from the Web site in exactly the same way as the items of bill data the EBPP system obtains in other ways.

Other aspects of the invention include scheduling the accesses according to the statement dates on the bills, checking validity of an item of bill data and incorporating the item only if it is valid, responding to an invalid item of bill data by modifying how items of bill data are read from the biller's Web site, and checking whether there is already an item of bill data in the EBPP system corresponding to the item of bill data obtained from the Web site, and in that case, not adding the obtained item of bill data to the EBPP system.

Another aspect of the invention is providing biller bill display data associated with the item of bill data in the biller's Web site to the EBPP system so that the EBPP system can display the biller bill display data. The EBPP system may modify the biller display data for display by the EBPP system. Modifications include adding information, replacing references in the biller display data to information in the biller Web site with references to information in the EBPP system, and removing interactive elements. These techniques are applicable not only in the context of EBPP systems, but generally to the problem of scraping information used to make a display from a Web site.

Other objects and advantages will be apparent to those skilled in the arts to which the invention pertains upon perusal of the following Detailed Description and drawing, wherein:

BRIEF DESCRIPTION OF THE DRAWING

FIG. 4 shows the display used to edit biller information in the EBPP system of the invention;

FIG. 6 shows scheduling data for Bill Bot 117;

FIG. 7A shows a first portion of a display made by a browser from an HTML page from site 129;

FIG. 7B shows a second portion of the display;

FIG. 8 shows a portion of a display made by a browser from a cleaned HTML page from site 129;

FIG. 9 shows portions of HTML from the scraped HTML page and the cleaned HTML page;

FIG. 10 shows other portions of HTML from the scraped HTML page and the cleaned HTML page;

FIG. 13 is an overview of the architecture of bill bot program 117.

Figure 1:
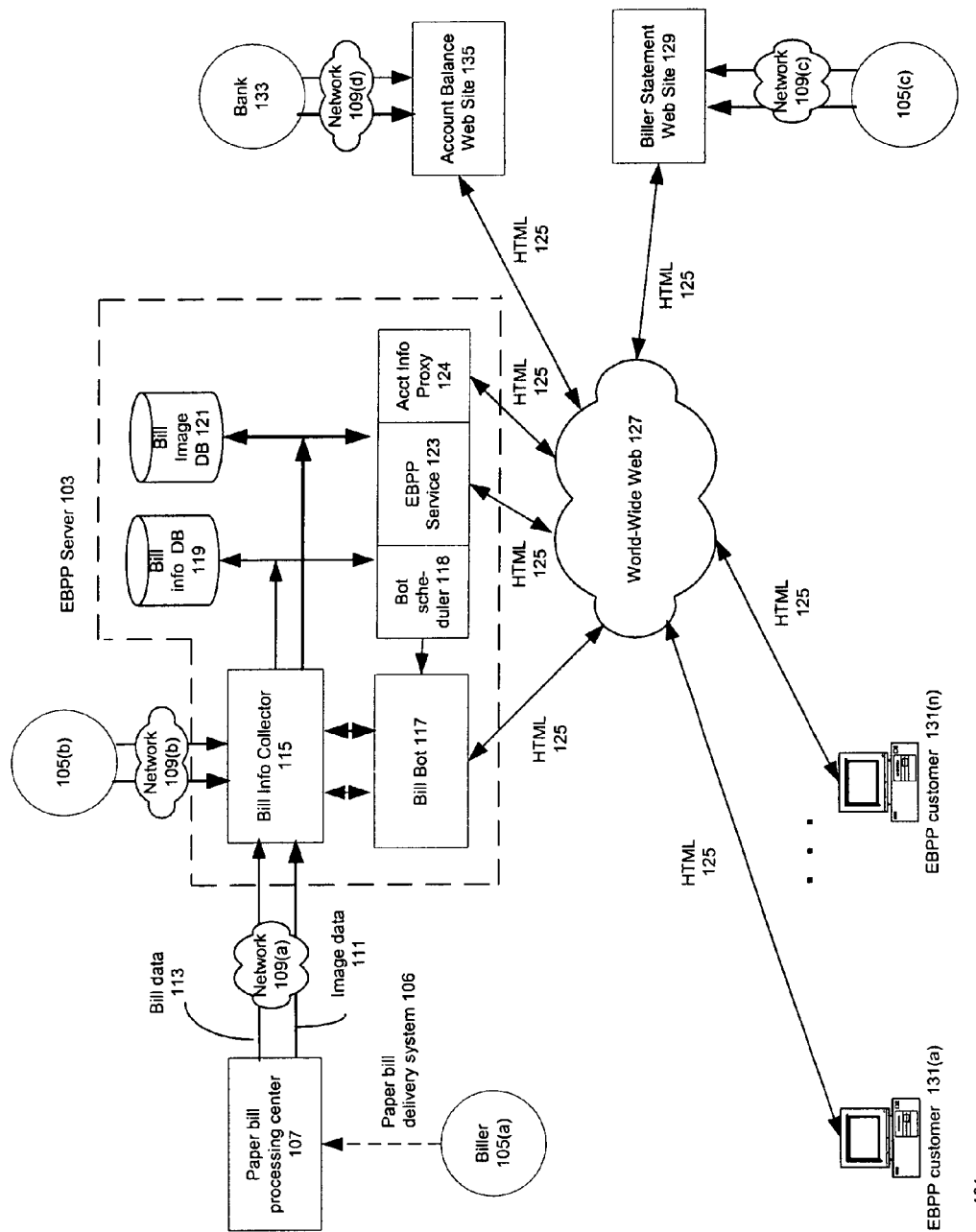
FIG. 1 is an overview block diagram of the EBPP system of the invention.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of the EBPP system in which the invention is embodied, will then present an overview of the user interface for the invention, and will finally present details of the implementation.

Overview of the EBPP System: FIG. 1

FIG. 1 is a high-level block diagram of EBPP system 101 in which the invention is embodied. Major components of the system are billers 105, EBPP customers 131, customer bank 133, and EBPP server 103. The customers communicate with EBPP server 103 via World-wide Web 127. The customers and EBPP server 103 interact according to the well-known https protocol. EBPP server 103 is a Web site, that is, it is identified by an Internet address, and when a customer 131 who is operating a Web browser in a computer which is connected to the Internet provides the server's Internet address to the browser, the browser sends a message to server 103 to which the server responds with an HTML page that the browser displays on the computer's monitor. The user can interact with the displayed HTML page, and as a result of the interaction, the browser returns information to the EBPP server, which processes the information and provides another HTML page that reflects the result of the processing to the customer. The process as described above continues until the user chooses to interact with another site on the Web.

The major components of EBPP server 103 are EBPP service 123, bill information database 119, and bill image database 121. EBPPP service 123 is the software that interacts with the customers' browsers. Bill information database 119 is a database of information about customers 131, billers 105, the financial institutions 133 that the customers use to pay their bills, and about the bills themselves. The information about the bills includes for each customer, information about individual bills that have not yet been paid, information about bills that the system will automatically pay unless the customer indicates otherwise, and a history of the bills paid by the customer. Each item of per-customer bill information about an individual bill that has not yet been paid will be termed an item of bill data in the following discussion. As already pointed out, an item of bill data typically includes the biller's account number, the statement date, the bill amount, the payment due date, minimum amount due, and/or total amount due. Bill image database 121 contains information such as an image or the HTML for the bill. EBPP service 123 uses this information to provide an HTML page which displays the bill corresponding to an item of bill data to the customer's browser.

Bill info collector 115 obtains bill information from billers 105 and stores it in bill database 119 and/or bill image database 121. The bill information comes from billers in three forms: paper bills, shown coming from biller 105(*a*), electronic bills, shown coming from biller 105(*b*), who uses either the Biller Service Provider or Biller Direct approach to electronic billing, and bills scraped from the biller's statement Web site 129, shown coming from biller 105(*c*). With paper bills, the biller sends the paper bill by a paper bill delivery system 106 such as the Post Office to paper bill processing center 107, which is run as part of EBPP system 101. At paper bill processing center 107, each bill is scanned to produce a digital image and the digital image is read by OCR software to obtain the item of bill data corresponding to the bill. The bill data 113 and the image data 111 are then sent via network 109(*a*) to bill info collector 115, which provides the item of bill data and the image data to databases 119 and 121 respectively.

With billers such as biller 105(*b*) who use electronic billing, the billers are connected by network 109(*b*) directly to bill info collector 115 and provide the electronic bills to bill info collector 115, which in turn provides the items of bill data and images from the electronic bills to databases 119 and 121. With electronic billing, the electronic bills may also be contained in storage media such as tapes that the biller provides to be loaded into EBPP server 103. Bill info collector 115 processes the electronic bills on the media in the same fashion as it does electronic bills received via the network.

EBPP server 103 maintains a list of billers 105(*c*) for which EBPP server 103 can obtain items of bill data from the biller's Web site 129. These billers will be termed in the following scrape-enabled billers. For each such biller, EBPP server 103 is able to read the HTML provided by the biller's Web site 129 to obtain the item of bill data corresponding to the bill and to make a version of the HTML which EBPP server can use to display the bill on the customer's browser. The HTML required to display the bill and any images required for that HTML are stored in bill image database 121. If a customer 131 so specifies, EBPP server 103 may obtain the customer's bills from one or more of these Web sites 129. This is done as follows:

1. The customer 131 provides EBPP server 103 with the information EBPP server 103 needs to access the customer's statements on a scrape-enabled biller's Web site 123; this information is termed hereinafter customer access information. EBPP service stores the customer access information along with an identification of the biller in the customer's information in bill data database 119.

2. EBPP service 123 thereupon provides the customer access information and the biller identification to bill bot 117, a software agent which uses the biller identification and the customer access information to access the customer's Web page on Web site 129 and scrape the item of bill data and the bill's HTML from Web site 129.

3. Bill bot 117 returns the scraped bill data and the bill's HTML to bill info collector 115, which provides the item of bill data to bill info database 119 and the HTML to image database 121. Included in the scraped item of bill data is the bill's statement date.

4. After the first such fetch of an item of bill data from Web site 129 for a customer, bot scheduler 118 reads the bill's statement date and uses it to determine the biller's billing cycle for the customer. It then adds this information to schedules it maintains for bill bot 117 for each of the scrape-enabled billers 105(*c*). The schedule ensures that bill bot 117 will collect an item of bill data for a given customer and biller shortly after the biller has posted a new statement for the customer.

5. Scheduler 118 then causes bill bot 117 to run as scheduled for each scrape-enabled biller 105(*c*); each time bill bot 117 runs, it obtains items of bill data from a given biller 105(*c*) for a list of customers and provides the items of bill data for the customers to bill info collector 115.

Account info proxy 124, finally, permits a customer of EBPP system 101 to obtain his or her account balance information for accounts maintained for the customer by bank 133 from the bank's account balance Web site 135 while remaining in EBPP system 101. EBPP system 101 then combines the account balance information with information in database 119 about payments the customer has made to compute a current bank balance 135.

It should be pointed out here that EBPP server 103 may be implemented using several different computer systems. In particular, EBPP service 123, proxy 124, and databases 119 and 121 may be implemented in a separate system from bill bot 117, scheduler 118, and bill info collector 115. Furthermore, a number of instances of bill bot program 117 may be executing simultaneously, either to fetch items of bill data from different Web sites 129 or from the same Web site 129.

Figure 2:
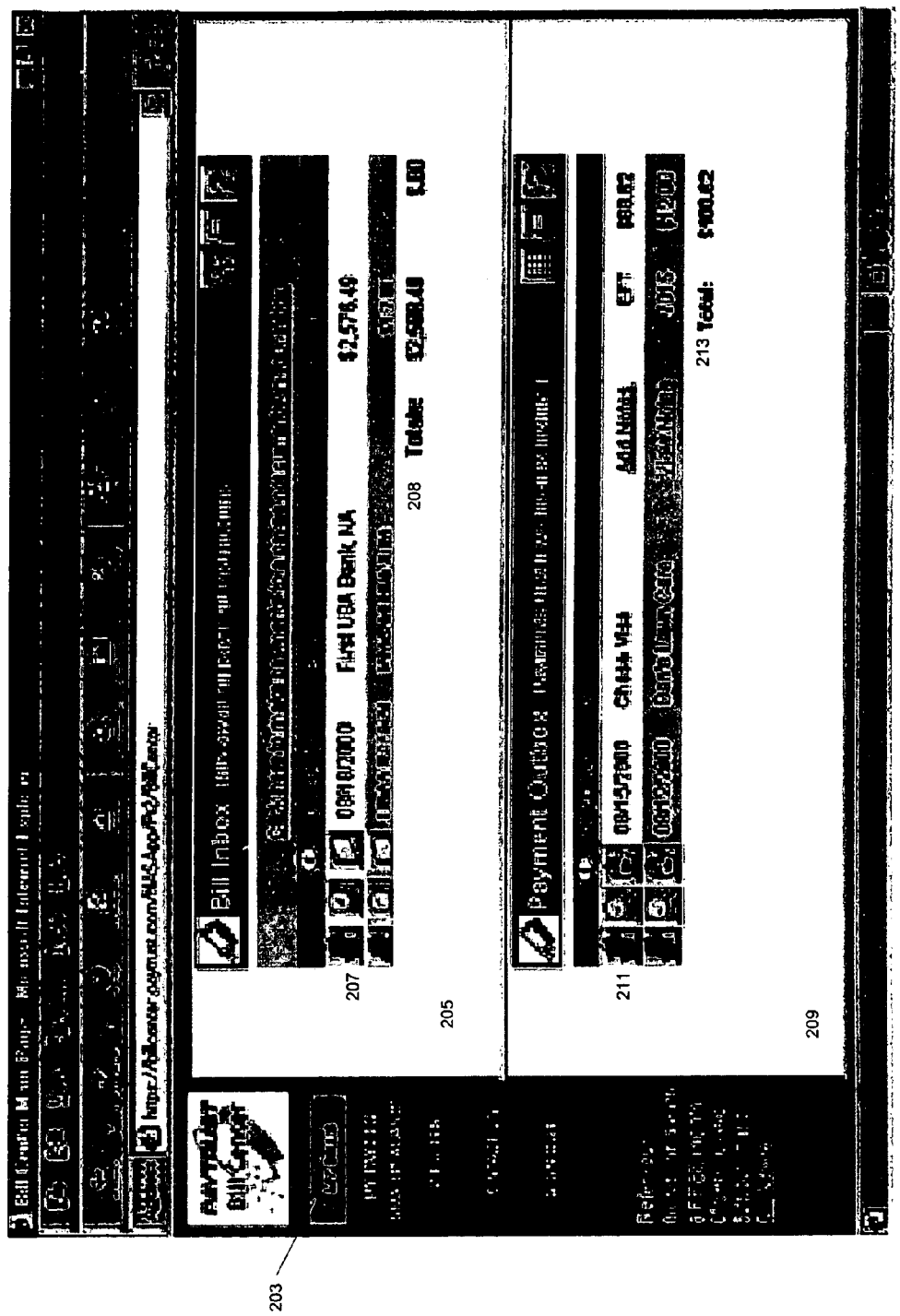
FIG. 2 shows the Bill Center display of the EBPP system of the invention.
Figure 3:
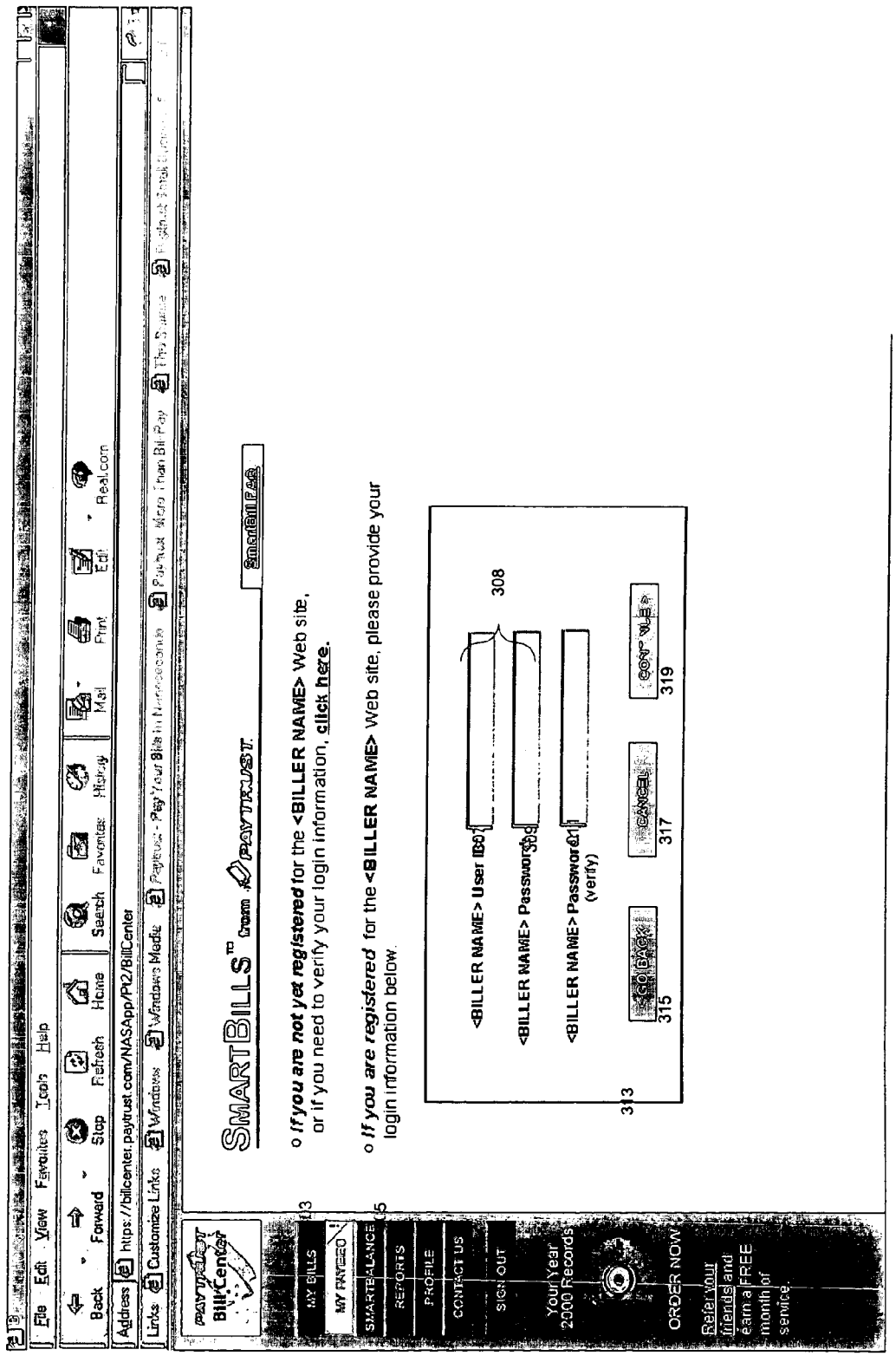
FIG. 3 shows the display used to begin including bills from a biller's statement Web site in the EBPP system of the invention.

Customer Interface to the EBPP System: FIGS. 2-4

FIG. 2 shows the bill center Web page 201 for the EBPP system of the preferred embodiment. The bill center is the interface that the customer uses to see what bills need to be paid and to select bills for payment. The customer reaches bill center Web page 201 by clicking on my bills button 203. The window has two main components: bill inbox 205, which contains a list of bills awaiting payment, and payment outbox 209, which contains a list of bills which EBPP system 101 has scheduled to automatically pay for the customer unless the customer indicates otherwise.

Bill inbox 205 contains entries 207 for all of the bills currently awaiting payment, regardless of whether the bill was received as a paper bill from the biller, was received in electronic form, or was scraped from the biller's statement Web site by bill bot 117. Each entry contains summary information for the bill that indicates the due date, the biller (payee), the total due, and the minimum payment. The summary information is made from the item of bill data for the bill. Totals at 208 indicate the total amount presently due and the total minimum amount due. There are three buttons to the right of the summary information; if the customer wishes the EBPP system to pay the bill, he or she clicks on the button with a $ sign; if the customer wishes to see an image of the bill, the customer clicks on the button with the magnifying glass; if the customer wishes to file the bill, the customer clicks on the third button. In each case, the result of clicking is a new HTML page for the desired operation.

Payment outbox contains entries 211 for all of the customer's bills for which the EBPP system has scheduled automatic payment but has not yet paid. Each entry specifies summary information for the payment including the date the payment is due, the name of the biller (payee), the check number or mode of payment if not by check, and the amount paid. With regard to the buttons to the right of the entry, the $ sign button lets the customer pay the bill immediately, the magnifying glass lets the customer see the bill's image, and the button with the hand lets the customer stop the scheduled payment.

FIG. 4 shows the HTML page 401 that lists the customer's billers (payees). The payees are divided into two classes: business billers and personal billers. To reach HTML page 401, the customer clicks on my payees button 404. Message 405 indicates that three of the business payees have been added to the list of scrape-enabled billers. Each entry 407 for a biller lists the biller's name, a category to which the biller belongs, and any payment rule for the biller's bills. A payment rule may for example specify that EBPP system 101 pay a bill automatically if it is below a certain amount or that a bill be paid at specific intervals. Again, there are three buttons: The $ button lets the customer pay the current bill for the payee; button 409 with the image of a pencil on it lets the customer edit the information which EBPP system 101 maintains about customer's relationship to the biller, and the button with the trash can permits the customer to remove the biller from the list.

When a biller is scrape enabled, a customer may edit the information which EBPP maintains about the customer's relationship to the biller to specify that the customer wishes EBPP system 101 to obtain his or her items of bill data from the biller by scraping the biller's statement Web site 129. FIG. 3 shows the HTML page 301 that EBPP service 123 provides to the customer's browser when the customer indicates that he or she wishes EBPP system 101 to scrape his or her items of bill data from the biller's Web site 129. In the actual page the name of the selected scrape-enabled biller appears at <BILLER NAME>. At 303, the customer may click to register for access to the biller's statement Web site 129 and obtain the customer access information that is necessary to access his or her account information on Web site 129. At 305, the user is asked for the customer access information required to access the biller's Web site 129. The actual customer access information will of course be specific to the customer and will vary with the biller's Web site. The customer enters the customer access information at 313. Here, the customer access information 308 required by the biller consists of a user ID, which the customer enters at 307, and a password, which the customer enters at 309. The password is entered a second time at 311 for verification purposes. Buttons at the bottom permit the customer to move to the previous HTML page (315), to cancel the change (317) and to continue editing. If the customer clicks on the latter button, service 123 initiates the process of setting up EBPP system 101 to obtain the customer's items of bill data from the biller by scraping. If the process is successful, the fact that the customer has elected to obtain items of bill data from the biller by scraping and the customer access information 308 input at 317 are added to the information which EBPP server 103 maintains about the customer. Bill bot 117 then uses the customer access information as described above to periodically access biller statement web site 129 for the customer.

Figure 5:
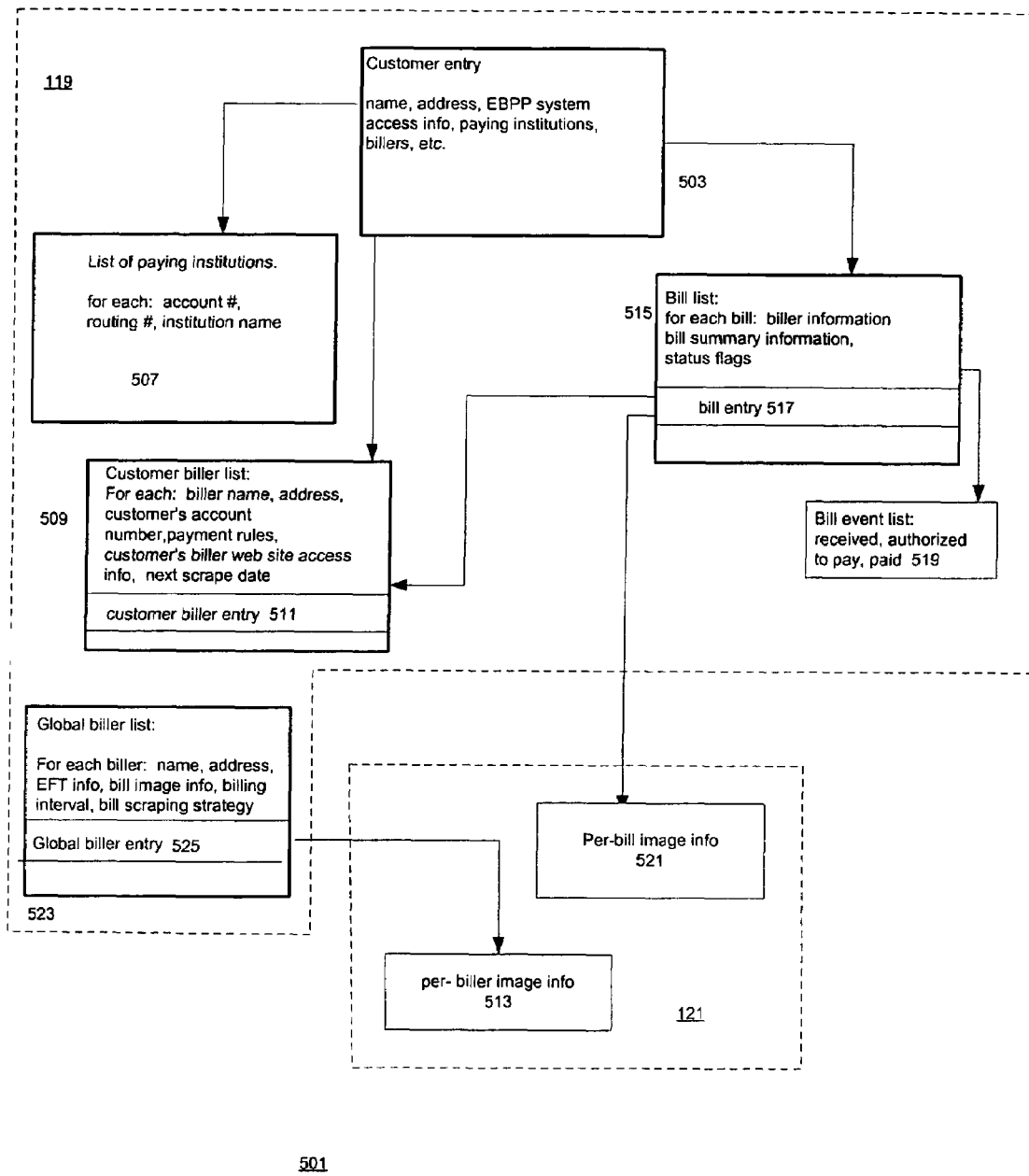
FIG. 5 is an overview of the structure of information in databases 119 and 121

Details of Bill Information in EBPP System 101: FIG. 5

As shown in FIG. 1, the bill information needed for EBPP system 101 to operate is primarily contained in bill information database 119, which contains the non-image bill information, and bill image database 121, which contains the HTML and any image information needed to provide the customer with a detailed view of a bill. FIG. 5 is a conceptual overview of these databases in a preferred embodiment. FIG. 5 looks at the information in these databases as it relates to a single customer. Of course, the customer is one of many in a database table of customers, and the information for the customers is similarly contained in database tables that have information for many customers. An entry 503 for a single customer in a table of customers contains the customer's name, address, access information for gaining access to the EBPP system, and profile. Corresponding to each entry 503 is a list of paying institutions 507 upon which EBPP system 101 writes checks to pay the customer's bills as specified by the customer for each biller. Each entry in the list of paying institutions indicates the paying institution's account number, routing number, institution name, and so forth.

Also corresponding to each customer entry 503 is a list 509 of that customer's billers. There is a biller entry 511 for each biller in list 509, and the entry for a given biller specifies the biller's name and address, the customer's account number with the biller, and any payment rules for paying bills from the biller for the customer. If the biller is scrape enabled and the customer has specified that EBPP system 101 is to use scraping to obtain the customer's items of bill data, the entry will also include the customer's access information for that biller's statement web site 129.

EBPP system 101 divides its billers into business payees and personal payees. Since a great many customers of EBPP system 101 may receive bills from the same business payee, EBPP system 101's bill information in database 119 includes a global biller list 523, which includes information for each biller on the list that is relevant to all of the bills for that biller. Included in the global biller entry 525 for a biller on list 523 are the biller's name and address, electronic funds transfer information, if relevant, and if the biller is scrape-enabled, the billing interval and the scraping strategy that bill bot 117 uses when scraping the biller's Web site 129. Scraping strategy will be explained in more detail below. Given a global biller entry 525, EBPP system 101 can also find per-biller image information 513 in bill image database 121. This information includes images and/or HTML and related data which system 101 uses to produce an image of the biller's statement.

Finally, there is a list of current bills 515 for each customer. Bill entry 517 contains biller information for the bill, the bill summary information, and status flags. Given bill entry 517, EBPP system 101 can also locate per-bill image information 521 and bill event list 519. For a personal payee, the per-bill image information is simply an image of the payee's invoice; for a scrape-enabled biller, it is a cleaned version of the HTML for the bill that bill bot 117 scraped from the biller's Web site 129. Events in bill event list 519 include when the bill was received, when the customer authorized payment of the bill, and when it was actually paid.

As may be seen from the foregoing discussion, given a customer entry, EBPP system 101 may find the customer's bill list; given a bill entry 517, system 101 may find the customer biller entry 511 for the biller, and given customer biller entry 511, system 101 may find the global biller entry for the biller. From the customer biller entry 511, system 101 can retrieve the information needed to access the customer's account with a scrape-enabled biller and from global biller entry 525, system 101 can retrieve the information needed to do the scraping and to display the bill's image.

Scheduling Information: FIG. 6

FIG. 6 shows the information used to schedule bill bot 117. As indicated above, each time EBPP system 101 scrapes a biller statement web site 129 for a customer who has agreed that the customer's bills from the biller should be obtained from web site 129, scheduler 118 reads the billing date from the customer's bill and uses the biller's billing interval to schedule the next scrape. Schedule 601 has an entry for each scrape that has been scheduled for a given customer and biller. Entry 603 contains information including the date of the next scrape, biller information 607 including a specifier for the scraping strategy, customer information 609, and the customer's access information for the Web site 611. When preparing the schedule for an execution of bill bot 117 on a given date, scheduler 118 queries schedule 601 by date and scrape-enabled biller. The result is for each biller a schedule 613 of the scrapings to be done on that date. The schedule includes an entry for each customer for which the scraping is to be done. Contained in the entry is the information that bill bot 117 needs to access web site 129 for the customer.

Scraping and Cleaning Items of Bill Data and Bill Image Information: FIGS. 7-10

With regard to scraped bills, EBPP system 101 must be able to combine the biller's per-biller image info 513 and the customer's per-bill image info 521 to produce a display on the customer's browser in response to a click on the bill image button that looks like the bill the customer would see when he or she accessed biller statement web site 129, but which has been produced by EBPP system 101 instead of web site 129. Simply making a copy of the HTML that was scraped from statement web site 129 and providing the copy to the customer's browser is not sufficient because the HTML from web site 129 is intended to work in the environment provided by web site 129 and will not work in the different environment of EBPP system 101. Among the reasons why it will not work are the following:

The scraped HTML may refer to files or other resources that are not available in EBPP system 101;

The scraped HTML may include functions that cannot be duplicated in EBPP system 101; and The customer may need information that is not included in the scraped HTML if the display produced by EBPP system 101 is to be useful to him or her.

In order to deal with these problems, EBPP system 101 modifies the scraped HTML it obtains from web site 129 to make cleaned HTML for display on the customer's browser.

The Displays: FIGS. 7A, 7B, and 8

FIGS. 7A and 7B show the display 701 that is produced when a customer of a particular biller that has a biller statement web site 129 accesses the web site. The display includes a header 703, which contains most of the bill summary data, three tables, table 715, which contains credit line info 715, account detail table 717, which has an entry 719 for each transaction that lists the sale date (721), transaction date (723), reference number (725), vendor (727), and amount (729) for each transaction, and summary table 733, which has a summary of the activities, with entries for purchases (735), advances (737), and totals (739). In addition, there is a message section 731, which may contain messages from the biller to the customer. As is generally the case with displays made from HTML pages, display 701 includes active areas, indicated in the display by underlines shown at 729 and 732. When the customer clicks on the active area, the customer receives another HTML page. As indicated on the display itself, when a customer clicks on an amount 729, the result is a Web page showing the details of the transaction; when the customer clicks on active area 732, the result is a Web page explaining the details of the biller's all-electronic billing service.

FIG. 8 shows a portion 801 of the display produced by the cleaned HTML produced from the scraped HTML. The portion shown includes header 703, credit line info 715, account detail 717, and the first line of the message in message section 731. As may be seen by comparing FIG. 8 with the corresponding portions of FIGS. 7A and 7B, there are three differences in the displays:

The label Your Citibank Card Services Statement (803) has been added. This is necessary because system 101 displays statements from many different billers, whereas statement web site 129 displays statements from only a single biller.

As shown at 805, the amounts in entries 719 are no longer active.

As shown at 807, neither is the word All-Electronic in message 731.

The modification of the cleaned HTML to eliminate the active areas is necessary because the customer of system 101 is interacting with server 103, not with the server at Web site 129. Because the amounts and All-Electronic are not longer active, display 801, though produced using HTML, behaves in exactly the same fashion as a scanned image of a bill that the customer of system 101 otherwise sees when he or she clicks on the image button.

The HTML for the Displays: FIGS. 9 and 10

FIG. 9 and FIG. 10 each show corresponding portions of the HTML as scraped from the biller and the cleaned HTML. Beginning with FIG. 9, this figure shows the HTML that sets up the environment for the rest of the HTML page. The HTML at 901 is from the scraped HTML; the HTML at 907 is from the cleaned HTML. At 903 and 905 are shown references to files that contain material that is relevant to the HTML page. The reference at 903 is a reference to a stylesheet file that determines how the information contained in the HTML will be rendered when it is displayed; the reference at 905 is to an image file that contains an image that will be displayed at a point in the displayed HTML page that corresponds to the point where the reference occurs. In the HTML page as scraped, both of these references are to files on Web site 129; in order to ensure that the engineers who maintain EBPP server 103 can see the scraped HTML exactly as it appears in Web site 129, corresponding files have been set up in EBPP server 103 and the scraped HTML has been modified to refer to these local files. It is these modified file references that appear at 903 and 905.

The corresponding part of the cleaned HTML is shown at 907. As shown at 909, reference 903 to the stylesheet file has been replaced by reference 909 to a stylesheet file that is specific to the cleaned HTML. In a preferred embodiment, this stylesheet file is part of per-biller image info 513. The HTML for the Your Citibank Card Services Statement that appears in the display 801 made from HTML portion 907 appears at 911; there is nothing corresponding to this HTML in HTML portion 901. Finally, as shown at 913, there is nothing in cleaned HTML 907 corresponding to the image referenced at 905 in the scraped HTML.

FIG. 10 shows the portion 1001 of the scraped HTML and the portion 1011 of the cleaned HTML that correspond to entry 719 in account detail 717. As already noted, the difference between entry 719 in display 701 made from the scraped HTML and entry 719 in display 801 made from the cleaned HTML is the absence of the active area in amount 729. As shown at 1003, each field in entry 719 is specified by a <TD> . . . </TD> construct which contains the value that is to appear in the field and format specifiers for the field. The <TD> . . . </TD> construct for amount field 729 appears at 1005; in addition to the field value and formatting information, it contains at 1009 an external reference, defined by <A> . . . </A>, to a Java server page /CB/amount.jsp. The reference includes a list of arguments that the code in the Java server page uses to generate the HTML for a Web page containing the transaction details when the customer of Web site 129 clicks on amount 729. As would be expected from the foregoing discussion of the differences between the display of FIGS. 7A and 7B and the display of FIG. 8, the external reference is completely lacking in HTML 1011 and amount field 729 is handled like all of the other fields in entry 719.

Figure 11:
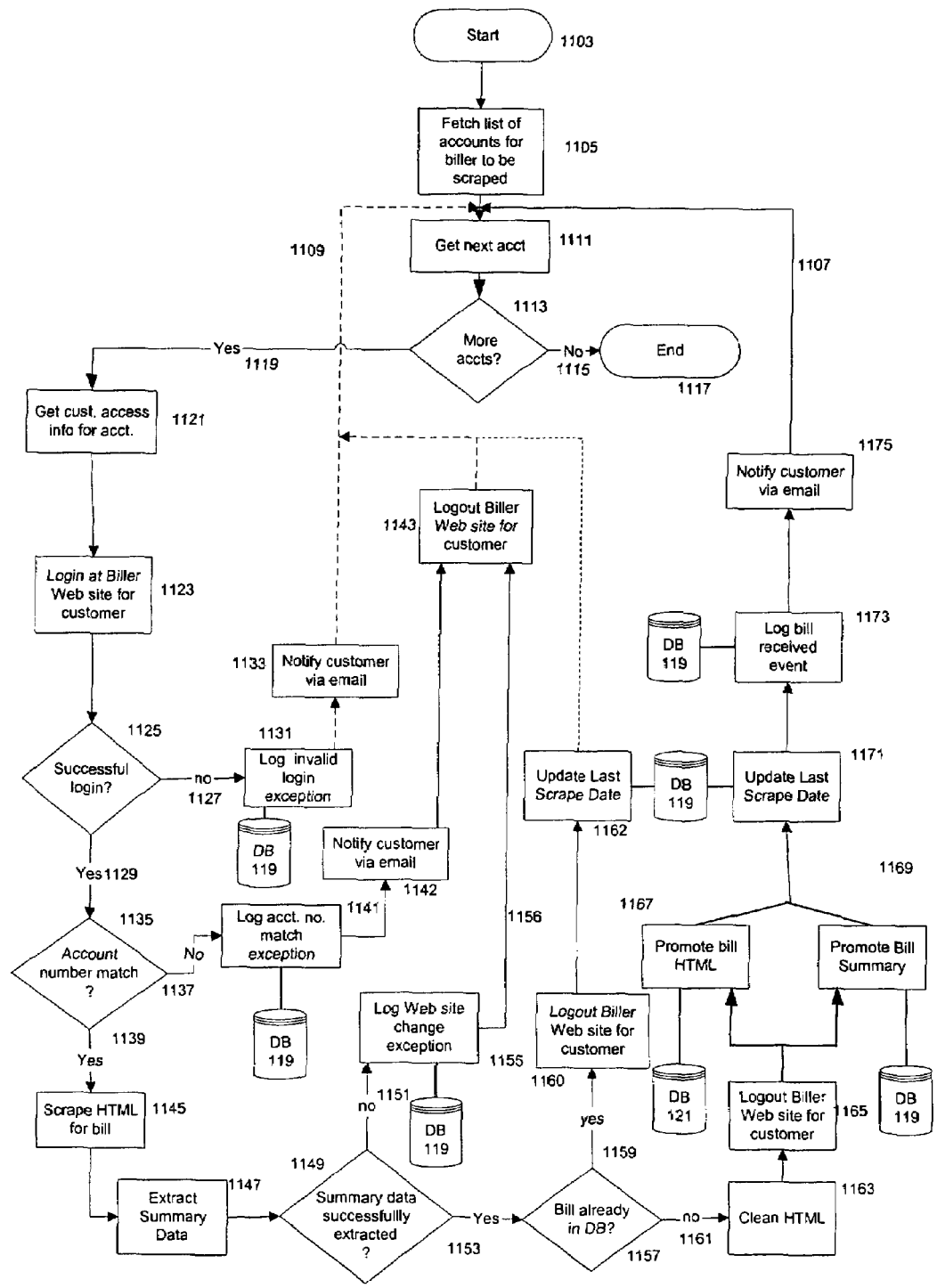
FIG. 11 is a flowchart of operation of bill bot 117 in a preferred embodiment.
Figure 12:
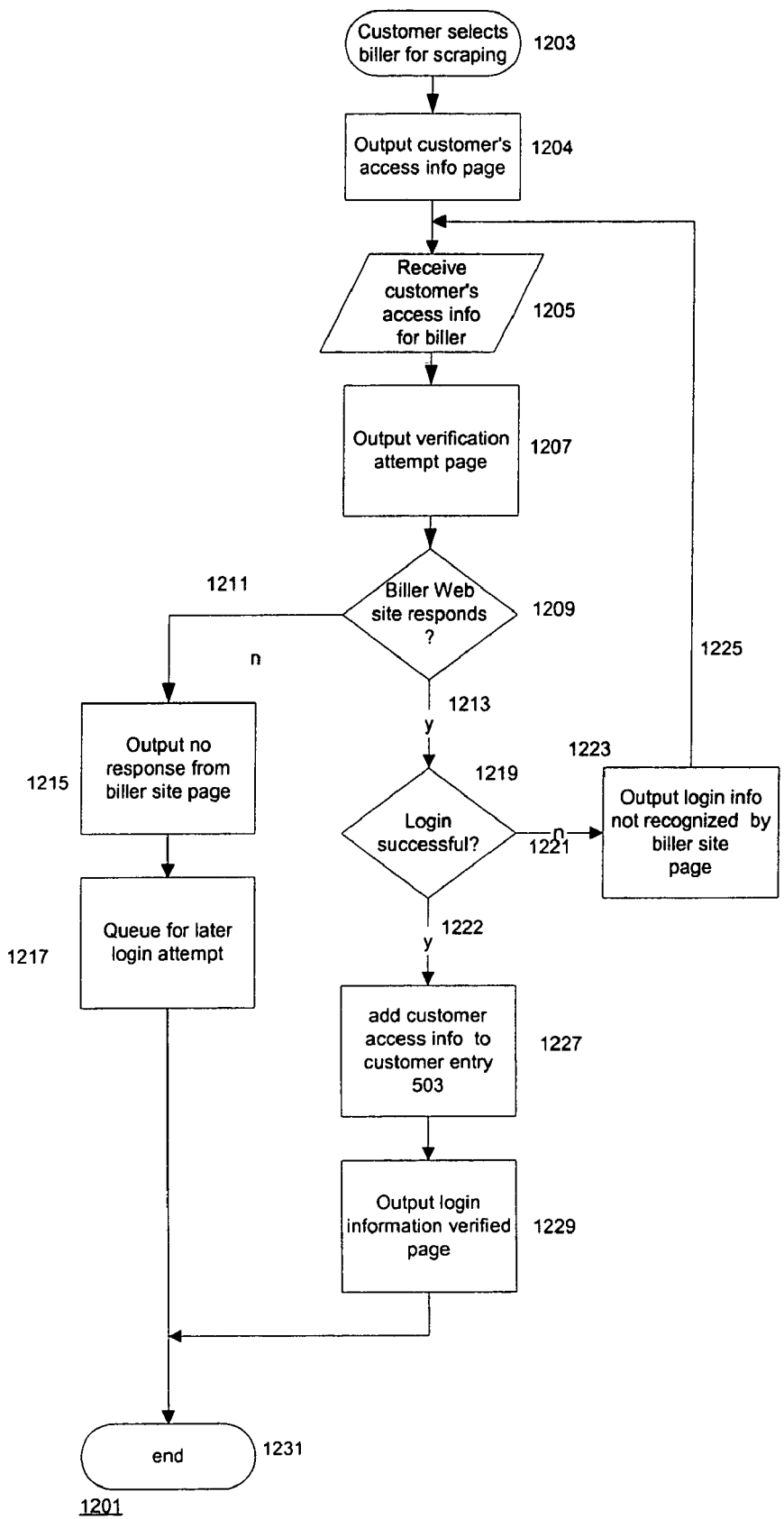
FIG. 12 is a flowchart of acquiring customer access information for a biller's Web site in a preferred embodiment.

Detailed Description of Operation: FIGS. 11 and 12

Details of Getting Customer Access Information: FIG. 12

FIG. 12 is a flowchart 1201 showing the details of how EBPP service 123 obtains a customer's access information for a biller from the customer. As previously pointed out, a preferred embodiment of EBPP system 101 does scraping of Biller's Web site 129 to obtain items of bill data only on the Web sites of scrape-enabled billers. As further seen in FIG. 3 and at 1203 in the flowchart, the customer has already selected a biller from a list of scrape-enabled billers before he or she inputs the access information. At 1204, EBPP service 123 provides Web page 301 to the customer's browser to receive the customer's access information for the biller's Web site 129; at 1205, the customer inputs the access information. At 1207, EBPP service 123 provides another Web page which indicates that verification is in process and asks the customer to wait. EBPP service 123 then attempts to access Web site 129 (1209).

If the Web site does not respond, EBPP service 123 takes branch 1211, in which it provides a Web page informing the customer that the Web site did not respond, queues the access information for a later login attempt, and ends the processing of flowchart 1201. EBPP service 123 processes the later login attempt essentially as shown in FIG. 12 starting at 1209, except that the later login attempt is not interactive, so email messages to the customer replace the Web pages. The number of times the login attempt is queued can of course be regulated by a parameter.

If the Web site did respond, EBPP service 123 takes branch 1213 and attempts to login using the customer's access information for Web site 129 (1219). If the login does not succeed, service 123 takes branch 1221, provides a Web page that indicates to the customer that the login failed and asks the customer to again enter the access information (1223), and returns via 1225 to block 1205. If the customer does not wish to try again, the customer can use a cancel button in the Web page to exit the processing of flowchart 1201.

If the login does succeed, service 123 takes branch 1222. It adds the customer access information to customer biller entry 511 for the customer who desires scraping and the biller to whom Web site 129 belongs (1227) and then outputs a login information verified page to the customer's browser, completing the processing of flowchart 1201.

Details of Scraping Bills: FIG. 11

FIG. 11 is a flowchart 1101 of the operation of bill bot 117 when it is scraping items of bill data from a given biller statement Web site 129. As already mentioned, bill bot 117 scrapes bill data according to a schedule provided to it by scheduler 118. The schedule for a given operation of bill bot 117 for a given scrape-enabled biller is organized as shown at 613 in FIG. 6. Scheduler 118 schedules a first scrape of a biller's Web site 129 for a given customer of EBPP system 101 when EBPP system 101 has received and verified the given customer's access information; scheduler 118 uses the statement date obtained in the first scrape, together with information about the billing interval used by the biller, to schedule the next scrape and then schedules each successive scrape using the statement date obtained in the previous scrape.

On calling bill bot 117 to scrape bill data from a given Web site 129, scheduler 118 specifies the configuration of bill bot 117 required to do the scraping. Each web site 129 may of course have its own statement format and there must be a configuration of bill bot 117 for each of the different statement formats that bill bot 117 must deal with. Configured bill bot 117 then fetches a list of accounts for the biller Web site that is to be scraped. Information in the list includes the customer's account number with the biller and the customer's access information for Web site 129. At 1111, bill bot 117 gets the next account; as shown at 1113, if there is no next account, scraping of that biller Web site 129 is done (branch 1115). Otherwise, bill bot 117 gets the customer access information (1121) and logs in at the biller Web site for the customer (1123). If the login is not successful (branch 1127), bill bot 117 logs an invalid login exception to bill information database 119 (1131), emails a notification of the problem to the customer (1133), and returns via 1109 to block 1111.

If the login is successful, bill bot 117 reads the account number from the Web site and compares it with the account number from the customer's customer information 609 (1135). If they are different, bill bot 117 takes branch 1137, logs an account number match exception (1141), notifies the customer via email (1142), logs the customer out of biller Web site 129, and returns via 1109 to block 111. If the account numbers match, bill bot 117 takes branch 1139 and scrapes the HTML for the bill from Web site 129 (1145).

Bill bot 117 processes the scraped HTML as follows: first it extracts the summary bill data (1147). The summary bill data contains the information needed for the item of bill data being scraped. If the summary data cannot be extracted (1149), the biller has changed the format of the Web pages on site 129 and a new configuration must be made so that bill bot 117 can scrape the new format. In this case, bill bot 117 takes branch 1151, logs a Web site change exception (1155), logs the customer out of the biller Web site (1156), and goes via 1109 to block 1111. Bill bot 117 does this instead of going to end 117 after logging out the customer because a given change may affect only a relatively small number of customers on a given scrape of site 129. Provision is made in EBPP system 101 for ending the scrape if it is noticed that there has been a change in site 129 which affects a great many customers.

Next, bill bot 117 uses the summary data to check whether EBPP server 103 has already received a paper copy of the scraped bill (1157). It does this by using the summary data to make a query for the bill which it applies to bill info database 119. If the bill is already in the database, a paper copy has been received and bill bot 117 returns to block 1111 via branch 1159, block 1160, block 1162, and branch 1109. In block 1160, bill bot 117 updates the scrape date for the customer and biller in schedule entry 603 to specify the next time the biller should be scraped for the customer and places the new scrape date in customer biller entry 511 for the customer and biller. If no paper copy has been received (branch 1161), bill bot 117 cleans the scraped HTML to get rid of references in the HTML local to biller Web site 129 and to get rid of behavior which only works if the customer is interacting with the biller's Web site (1163).

Once bill bot 117 has cleaned the HTML, it logs the customer out from the biller's web site (1165) and stores the scraped bill information in the databases. The cleaned HTML goes into per-bill image info 521 in bill image database 121 (1167), while the bill summary information goes into a bill entry 517 in bill info database 119. Then bill bot 117 updates the scrape date for the customer (1171) Finally, bot 117 logs a bill received event in bill event list 519 for the customer and bill (1173), sends the customer email notifying him or her of the arrival of the new bill (1175), and returns via 1107 to box Details Concerning Exceptions As shown in FIG. 11, three exceptions may occur when bill bot 117 is scraping information for an account from Web site 129:

an invalid login exception, shown at 1131;
an account number match exception. shown at 1141; and
a Web site change exception, shown at 1155.
Details concerning these exceptions follow.

Invalid Login Exception

Invalid login exceptions occur when a customer enters customer access information that is not recognized by the biller's Web site. When this occurs, the customer is notified via email that the access information he or she provided was not recognized by the biller's Web site. The customer is asked to return to the Bill Center of FIG. 2 and re-enter the proper information. The notification also states that the customer will not be able to receive this particular bill online until he or she enters valid login information. The customer will still be able to issue payments to this biller through the Bill Center, but the customer will have to refer to the paper bill the customer received at home for the due date, amount due, and other statement details.

When a customer returns to the Bill Center and updates his or her access information, the customer's account is scheduled for scraping during the next scrape session. If the login is successful, then the customer's most recent statement is retrieved and processed as already described. If the login is still unsuccessful, another email notice is delivered to the customer and EBPP system 101 will wait until the customer has updated his or her login information before again attempting to access the biller's Web site for the customer.

Account Number Match Exception

In the event that EBPP system 101 is successful in obtaining a customer's statement from the biller's Web site, bill bot 117 compares the account number that is displayed on the bill with the account number that the customer provided to system 101. If the account numbers do not match, an email notification is delivered to the customer notifying the customer of this discrepancy. The notification also states that the customer will not be able to receive this particular bill online until he or she updates the account information. The customer will be able to issue payments to this biller through Bill Center 201, but will have to refer to the paper bill the customer receives at home for the due date, amount due, and other statement details.

When a customer returns to the Bill Center and updates his or her account information, the account is scheduled for bill bot 117's next scrape of the biller's Web site 129. If the account number on the bill matches the account number in database 119 on that scrape, then the bill is staged for posting via the normal cycle. If the account numbers still do not match, another email notice is delivered to the customer and system 101 will wait until the customer has updated the account information again before re-attempting to access the biller's Web site for the customer.

Web Site Change Exception

Bill bot 117 is designed to report any changes to the format of the HTML on the pages which it receives from Biller web site 135. Bill bot 117 looks for bill summary information in specific areas of the HTML of the bill. The bill summary information that bill bot 117 looks for in a preferred embodiment is: Statement Date, Payment Due Date, Minimum Amount Due, and/or Total Amount Due. If any of these elements is missing, or has been moved or altered in the HTML, bill bot 117 generates an exception report. The exception report is stored in DB 119 and is delivered to the team of software engineers responsible for maintaining bill bot 117. The team responds to the exception report by reviewing all of the bills for that particular biller in order to identify the changes that have taken place on the HTML of the bill. Any significant changes that are made to the biller's Web site require a change to bill bot 117. Once the changes have been put in place, bill bot 117 is rescheduled for that biller in order to retrieve the set of customer bills. The new bills are scrutinized for accuracy, and if they are accurate, are then posted to customers' accounts. The team can generally adapt bill bot 117 to a change to a biller's Web site within 24 hours.

Details of Bill Bot 117: FIGS. 13-15

Bill bot 117 is a program that is written in the well-known Java™ programming language. The program is implemented using may Java libraries, including the following:

1. Libraries provided as freeware by Sun Microsystems. They include
   XML Parser and
   JDBC API.
2. A free version of the HTTP Client available under the GNU Lesser General Public
   License (HTTP Client).
3. The SSL layer for making https requests comes from a licensed copy of Baltimore Technologies' KeyTools SSL version 5.0.
4. Apache Software Foundation's regular expression package called Regexp.

FIG. 13 provides an overview of the architecture of bill bot program 117. A programmer who is writing a program in the Java language defines the program's data objects and the operations that manipulate them by making class definitions. An operation is defined by writing a method for the operation, i.e, code that performs the operation. One kind of method is a constructor, a method that constructs an instance of the data object defined by the class. One way of making a class definition is to extend an existing class definition by changing the definition of the data objects and/or the methods. The class that has thus been extended is a subclass of the original class.

Billbot main program 1303 is invoked by scheduler 118 with a specification of a list of accounts and access information 613 for a given biller Web site 129(i) and a specification of the strategy that bill bot program 103 is to use to read the biller Web site 129(i). Main program 1303 gets the account list and selects the strategy required for the Web site where the accounts are located. The strategy is implemented as a Java class and main program 1303 uses methods belonging to the strategy's class to access the Web site and read the Web pages for each account.

In the preferred embodiment, the classes that define the strategies are subclasses of the class StatementSiteStrategy 1305, which is the superclass for the subclasses. The class-subclass relationship is shown by the fact that the boxes representing the subclasses 1307 are contained within the box representing their superclass 1305. All of the strategy classes make the same set of methods available to main program 1303, but a given method does what is required for the Web site 129 it is used with. Unless two biller Web sites 129 are identical with regard to how they are accessed and with regard to their Web pages, separate strategies are required for the Web sites. There will thus in most cases be a strategy subclass 1307(i) for each scrape-enabled biller's Web site 129(i). Moreover, if the biller changes the Web site with regard to how it is accessed or with regard to its Web pages, the strategy for the biller's Web site must be modified so that it works with the pages received from the modified Web site.

A single strategy subclass 1307(i) for the MBNA America Web site appears in more detail in FIG. 13. The methods of particular interest are Execute method 1311 and PostExecuteCleanUp method 1313. Execute method 1311 creates page handler objects to contain the scraped pages, logs in and gets the login page, and then handles the Web site's pages as required to access the account and get the account summary and account detail information. PostExecuteCleanUp method 1313 cleans the previously-scraped account detail page.

MBNA America strategy subclass 307(i) in turn uses a set of subclasses of the class StatementPageHandler that have been extended to deal with the pages which a user of Web site 129(i) will encounter when he or she logs in to view an account. In Web site 129(i), there are six Web pages that are of concern, and there is a subclass for each of the pages. Each of the subclasses has a constructor and two methods 1318: getSignature, which adds a character string to the scraped Web page which identifies it to other components of bill bot program 117 and of EBPP server 103, and evaluatePage, which retrieves information from the page. The signature and the information go into an object that is defined by the subclass. A user of Web site 129(i) may encounter a login page, whose corresponding subclass is subclass 1317, a page that permits the user to change his or her profile information, whose subclass is 1319, a home page for the user's account, whose subclass is 1321, a page which permits the user to select which statement he or she would like to view, whose subclass is 1323, a page which permits the user to see the detail for the selected statement, whose subclass is 1325, and a page that permits the user to select an account, whose subclass is 1325.

CONCLUSION

The foregoing Detailed Description has disclosed to those skilled in the relevant technologies the best mode known to the inventors of making and using the EBPP system of the invention and of employing the technique of scraping to extract display information. It will be immediately apparent to those skilled in the relevant technologies that the principles of the invention may be applied not only in the context of the Web, but in any context where a customer of the EBPP has access to other information via a network, and that the technique of scraping to extract display information may be used for any kind of display information, not just HTML pages. In particular, the technique may be applied to XML pages.

Additionally, the EBPP system of the invention may be implemented in many different ways. As already pointed out, the components of the system may be distributed across a number of systems. In some embodiments, the bill bot may retrieve only items of bill data; in others, it may retrieve only image data. The behavior of the bill bot will of course depend on what it is retrieving and on the characteristics of the Web site from which the bill bot is retrieving information. Moreover, while it is particularly advantageous to implement the bill bot using the Java language, the bill bot may be implemented in any programming language.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method for aggregating bills from a biller website via the Internet to provide items of bill data to a user and to facilitate payments of the items of bill data for the user, the method comprising the steps of:
   configuring a bot to operate as an agent for the user, said bot accessing said biller website and gathering bill data for said user;
   providing an interface for the user to enter user access information required to access said biller website;
   receiving said user access information from the user;
   validating said user access information at said biller website by logging in at said biller website;
   notifying the user if the validation of said user access information fails;

accessing said biller website with said bot using said user access information to scrape user bill data from said biller website;

using said user access information to access the biller website at scheduled times to provide an additional item of bill data for the user, wherein the additional item of bill data includes a statement date;

incorporating the additional item of bill data into the items of bill data; and providing an interface for the user to enter bill payment information necessary to pay a bill.

2. The method set forth in claim 1, further comprising the steps of:

receiving electronic items of bill data from a biller over a network; and allowing the user to perform operations on items of bill data including at least indicating payment of a bill that corresponds to an item of bill data.

3. The method set forth in claim 1, further comprises the step of:

using the statement date to schedule the step of using the received user access information to access the biller website.

4. The method set forth in claim 1, further comprising the step of:

determining validity of the provided additional item of bill data, wherein the step of incorporating the provided additional item of bill data into the items of bill data is initiated when the provided additional item of bill data is determined valid.

5. The method set forth in claim 1, further comprising the steps of:

determining whether a Web page provided by the biller website is different from a Web page previously provided by the biller website; and modifying the manner in which the additional bill data is scraped to read the different Web page of the biller website.

6. The method set forth in claim 1, further comprising the steps of:

receiving items of bill data from a biller in ways other than from a biller website;

determining whether the provided item of bill data duplicates an item of bill data is already contained in the items of bill data; and maintaining a single copy of the duplicate item of bill data in the items of bill data.

7. The method set forth in claim 1, further comprising the steps of:

maintaining user bill display data associated with the item of bill data, the user bill display data being used to display the individual bill corresponding to the item of bill data to the user;

maintaining biller bill display data associated with the additional item of bill data;

using the received user access information to periodically access the biller website to further provides the biller bill display data associated with the provided additional item of bill data; and incorporating the biller bill display data into the maintained user bill display data.

8. The method set forth in claim 7, further comprising the step of:

modifying the biller bill display data to make user bill display data thereof.

9. The method set forth in claim 8, wherein the step of modifying includes the step of removing an interactive element from the biller display data.

10. The method set forth in claim 8, wherein the step of modifying includes the step of replacing a reference in the biller display data to information external thereto in the biller website.

11. An electronic bill presentment and payment system, the system comprising:

a user interface for enabling a user to enter user financial account information and user access information for use in accessing a biller website for scraping bill data at said biller website;

a bill information database that contains the user's items of bill data and user access information for the user that is accessible to the user;

a bill bot using the user access information to access the biller website at scheduled times to provide an additional item of bill data for the user, said bill bot scraping said biller website to obtain bill data for said user, said bill bot returning said user bill data from said biller website to said bill information database;

a bill center having an interface for allowing the user to view which bills need to be paid and to select bills for payment, said bill center using said user financial account information to initiate payment on behalf of the user; and a scheduling component enabling the user to schedule a payment initiation date, said scheduling component allowing the user to define payment rules.

12. The EBPP system set forth in claim 11, wherein said scheduling component reads the billing date from the scraped bill data to calculate a billing interval and to schedule a next scrape date for said bill bot using said billing interval.

13. The system set forth in claim 11, wherein said scheduling component allows the user to schedule the bill bot's access of the biller website.

14. The system set forth in claim 13, wherein the additional item of bill data includes a statement date; and said scheduling component uses the statement date to schedule the bill bot's access of the biller website.

15. The system set forth in claim 11, wherein the bill bot determines validity of the additional item of bill data and does not provide an invalid additional item of data.

16. The system set forth in claim 11, wherein the bill information database receives items of bill data from a biller in ways other than from a biller website; and the bill bot provides the additional item of bill data only when the bill bot has determined that the additional item of bill data does not duplicate an item of bill data that is already contained in the items of bill data.

17. The system set forth in claim 11, wherein:

said bill information database maintains user bill display data associated with the item of bill data, the bill display data being used to display the individual bill corresponding to the item of bill data to the user;

the biller website further maintains biller bill display data associated with the additional item of bill data; and the bill bot further provides the biller bill display data associated with the received additional item of bill data, the bill information database incorporating the provided biller bill display data into the bill display data.

18. The system set forth in claim 17, wherein the bill bot further modifies the biller display data to make user bill display data thereof.

19. The system set forth in claim 18, wherein the bill bot modifies the biller display data to remove an interactive element therefrom.

20. The system set forth in claim 18, wherein the bill bot modifies the biller display data by replacing a reference in the biller display data to information external thereto in the biller website.

21. The system set forth in claim 18, wherein the bill bot modifies the biller display data by adding an identification of the biller thereto.

* * * * *

UNITED STATES PATENT AND TRADEMARK OFFICE
CERTIFICATE OF CORRECTION

PATENT NO.         : 7,370,014 B1
APPLICATION NO. : 09/999311
DATED                : May 6, 2008
INVENTOR(S)       : Dhaval Vasavada, Alex Kosowski and Eric Jamison Page 1 of 1

It is certified that error appears in the above-identified patent and that said Letters Patent is hereby corrected as shown below:

Col. 13, Line 47: "returns via 1117 to box" should be -- returns via 1117 to box 1111 --

Col. 18, Line 31: "The EBPP system" should be -- The system --

Signed and Sealed this

Sixth Day of January, 2009

JON W. DUDAS
*Director of the United States Patent and Trademark Office*